United States Patent
Tan

Patent Number: 5,784,379
Date of Patent: Jul. 21, 1998

[54] CLOCK RECOVERY FOR ATM RECEIVER

[75] Inventor: Han Hiong Tan, Berkel en Rodenrijs, Netherlands

[73] Assignee: Koninklijke PTT Nederland N.V., Netherlands

[21] Appl. No.: 525,302

[22] Filed: Sep. 7, 1995

[30] Foreign Application Priority Data

Sep. 21, 1994 [NL] Netherlands ............... 9401525

[51] Int. Cl.$^6$ ................................................. H04L 12/56
[52] U.S. Cl. ................................... 370/503; 370/395
[58] Field of Search ........................ 370/503, 395, 370/516, 389, 518, 519, 520, 509, 512, 514; 340/825.2; 375/354, 357, 371, 376

[56] References Cited

U.S. PATENT DOCUMENTS

| 4,105,946 | 8/1978 | Ikeda . | |
|---|---|---|---|
| 5,544,170 | 8/1996 | Kasahasa | 370/395 |
| 5,548,580 | 8/1996 | Buckhand | 370/252 |

FOREIGN PATENT DOCUMENTS

0577329  1/1994  European Pat. Off. .

OTHER PUBLICATIONS

Chao et al, "Asynchronous Transfer Mode Packet Video Transmission System", Optical Engineering, vol. 28, No. 7, Jul. 28, 1989, pp. 781–788.

*Primary Examiner*—Dang Ton
*Attorney, Agent, or Firm*—Michaelson & Wallace; Peter L. Michaelson

[57] ABSTRACT

Clock recovery circuit for an ATM receiver that automatically derives the frequency of the source signal which is transmitted by the ATM cells. A subcircuit (3, 4, 5) determines, on the basis of the cell rate, the nominal bit rate of the source signal and generates a clock signal having a frequency which is consistent therewith. A second subcircuit (6, 7, 8, 9, 10) corrects, in proportion to the difference between the nominal bit rate and a mean actual bit rate, the frequency of the clock signal generated by the first subcircuit.

5 Claims, 2 Drawing Sheets

CLOCK RECOVERY FOR ATM RECEIVER

A. BACKGROUND OF THE INVENTION

The invention relates to an ATM receiver, in particular a clock recovery circuit for use therein.

In an ATM transmission system it is possible to transmit, via various virtual channels, source signals at different bit rates, as a result of which the number of ATM cells per unit time, the cell rate, may differ in the one virtual channel from that in another channel. Where the cells of a particular channel arrive at a receiver—allocated temporarily to the channel—the cells must, after having been incorporated in a buffer, be read out therefrom at a clock frequency which is consistent with the cell rate of that channel and with the bit rate (and clock frequency) of the source signal.

The subject of the present invention is a circuit for deriving, from the cell arrival times, the clock frequency at which the buffer is read out. In the process it is necessary to allow for different nominal cell rates and for variations within those nominal cell rates. So far, the objective of detecting, in a satisfactory manner and entirely automatically, the clock frequency from the arrival times of ATM cells has not been met with a known solution.

B. SUMMARY OF THE INVENTION

The invention comprises a clock recovery circuit for an ATM receiver, the clock frequency being derived entirely automatically from the cell arrival times. To this end, the circuit according to the invention comprises first means for determining, on the basis of the cell rate of the received cells, the nominal bit rate of the source signal and generating a clock signal having a frequency which is consistent therewith, and second means for correcting, in proportion to the difference between the nominal bit rate determined by the first means and the mean actual bit rate, the frequency of the clock signal generated by the first means. The invention will be expounded hereinafter with reference to a number of figures.

C. BRIEF DESCRIPTION OF THE DRAWINGS

DETAILED DESCRIPTION

Figure 1:
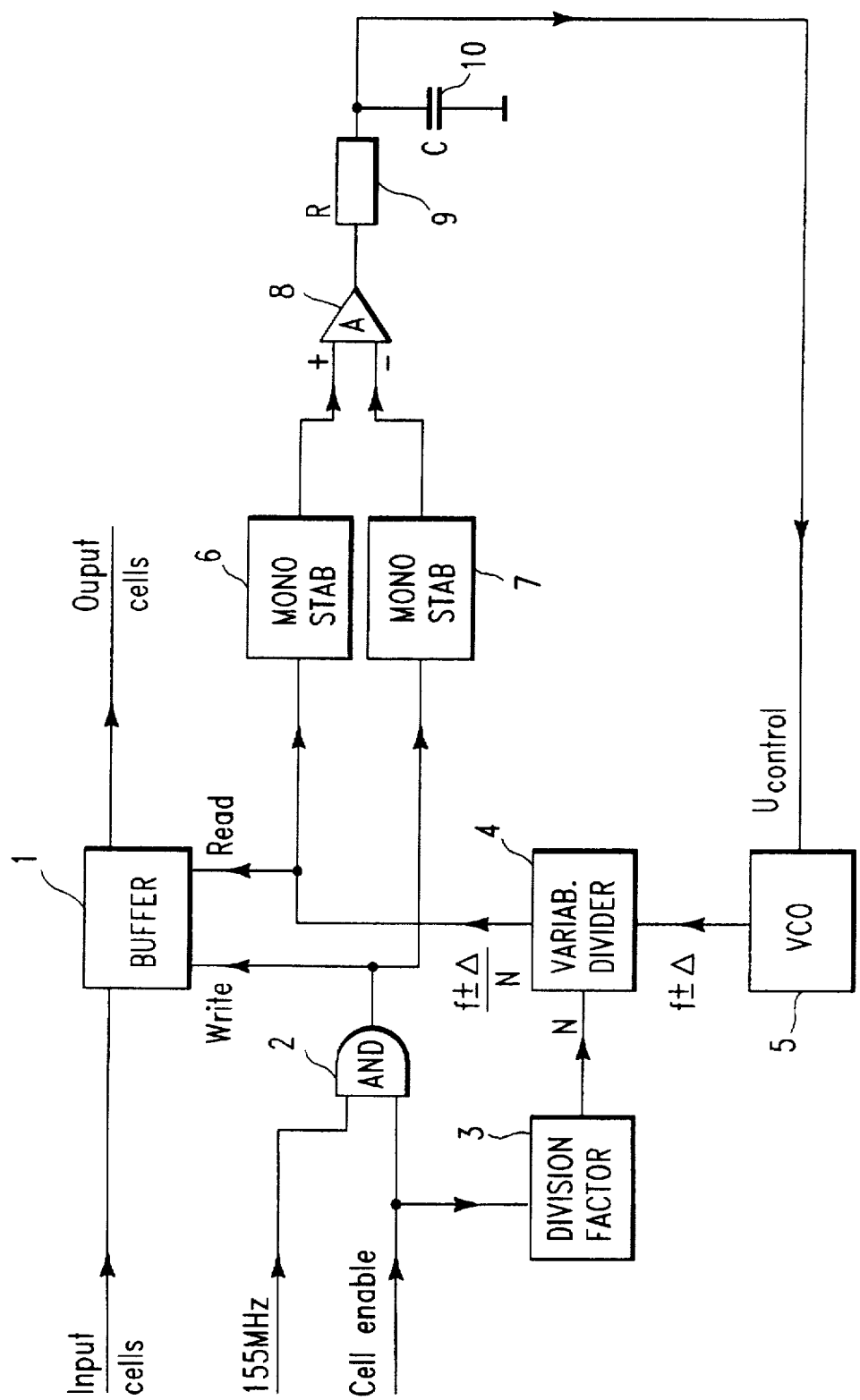
FIG. 1 shows an illustrative embodiment of the invention.
Figure 2:
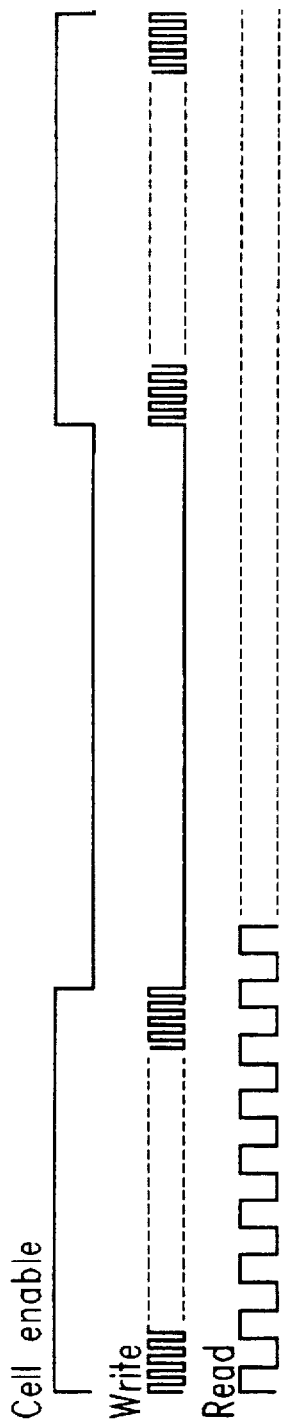
FIG. 2 depicts a number of signals.

The circuit shown in FIG. 1 has been designed for automatic recovery of the source clock for source signals having bit rates of 64, 128, 144, 192, 256, 512, 1024 and 2048 kbits/sec. ATM cells are fed to a buffer 1 via an input circuit. By an AND gate 2, a WRITE signal is composed for the cell buffer 1 from a network clock signal of 155.520 MHz (current standard for ATM networks) and a "cell enable" signal by means of which an ATM cell is admitted by the input circuit to buffer 1. Such a "cell enable" signal is produced, for example, by an access monitoring unit such as that described in patent EP -381 275 B1 in the name of Applicant. The WRITE signal has a "burst" character (see also FIG. 2). The rest of the circuit serves to produce a READ clock signal which corresponds to the cell rate of the cells presented to buffer 1 and which does not have a burst character (see also FIG. 2). The frequency of that READ signal is equal to the bit rate of the source signal and therefore equal to the frequency of the source clock.

The circuit includes a coarse adjustment for the clock frequency at which buffer 1 is read out, comprising a division factor adjustment 3 and a variable frequency divider 4. The circuit further includes a fine adjustment, comprising monostable multivibrators 6 and 7, an amplifier 8, a low-pass filter 9, 10 and a VCO (Voltage Controlled Oscillator).

The division factor adjustment 3 is driven by the "cell enable" signal. After the time between two (or more) successive "cell enable" signals has been measured and the measured time has been categorized in accordance with a closest standard time which corresponds to one of the abovementioned bit rates, a division factor N which has been allocated to that closest standard time is presented to the frequency divider 4. The frequency divider 4 divides the frequency of the clock signal which is presented by the VCO 5 by factor N.

The variation in cell arrival times (see also FIG. 3) must be compensated for by a fine adjustment. To this end, the WRITE signal is also presented to a monostable multivibrator 7, which assigns a defined width to the WRITE pulses presented. The READ signal is presented to a monostable multivibrator 6 which ensures that the READ pulses are assigned a defined width. The two signals then pass to the +and −input, respectively, of an amplifier 8. At the output a capacitor 10, via a resistor 9, is charged by the READ pulses and discharged by the WRITE pulses. In the case of equilibrium between the number of cells written to the buffer and the number of cells read out, there is equilibrium between charging and discharging of the capacitor 10. If the number of WRITE pulses increases with respect to the number of READ pulses, the voltage $U_{control}$ across capacitor 10 drops, and the frequency of the VCO 5 is readjusted, as a result of which the READ clock frequency increases.

Figure 3:
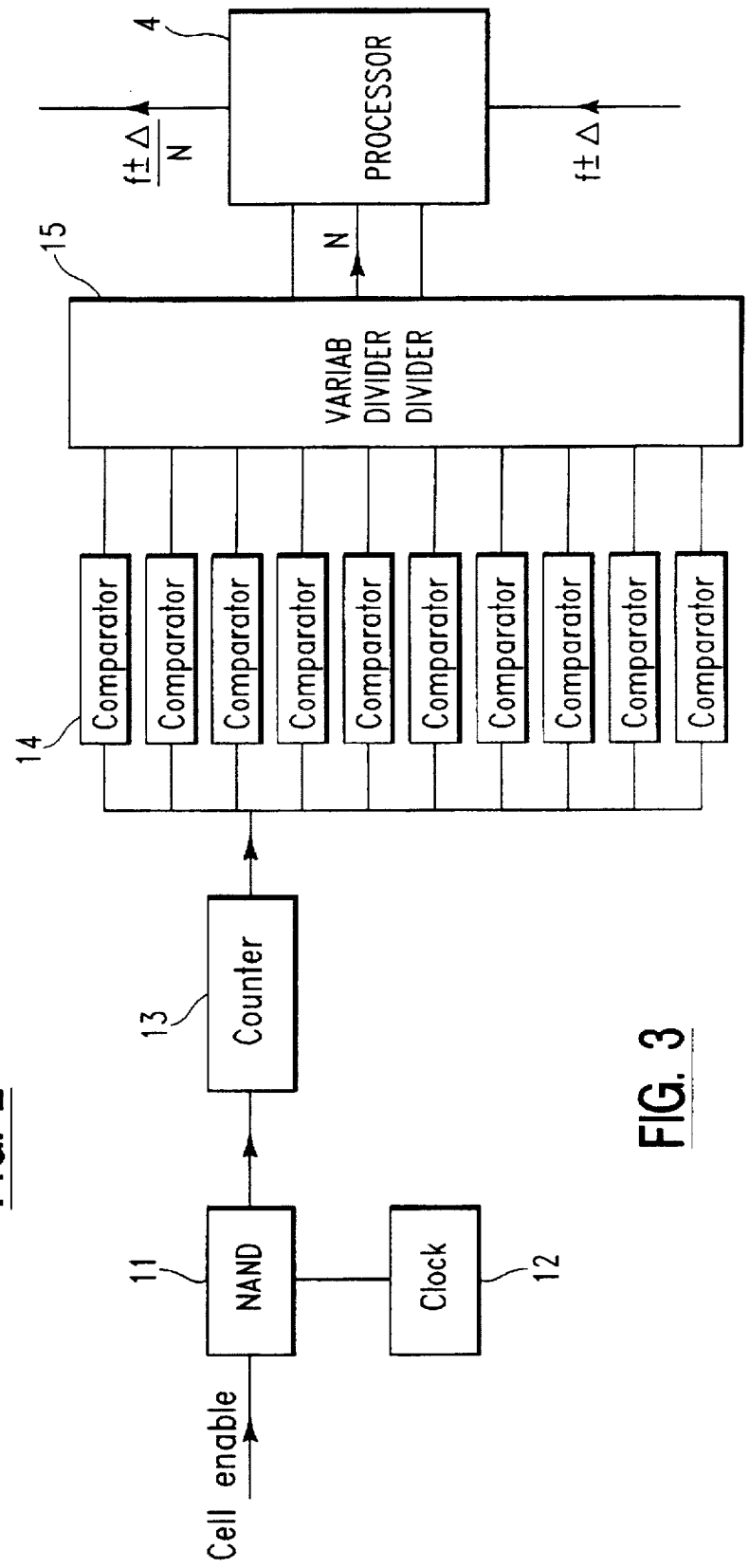
FIG. 3 shows an illustrative embodiment of one of the units shown in FIG. 1.

FIG. 3 shows a specific embodiment of the abovementioned unit 3 which calculates the division factor N. This unit comprises a NAND gate 11, a clock generator 12 and a counter 13. Counter 13 receives pulses from clock generator 12 during the period when there is no "cell enable" signal (see also FIG. 2). If the cell rate is low, that period is relatively long and the counter attains a relatively high value; at a high cell rate, the counter reaches only a low value. The counter value reached is presented to a number of digital comparators 14 which are each set to a counter value which represents a specific nominal bit rate. The comparator 14 which has a counter value which is closest to the counter value reached by the counter 13 gives an indication to processor 15. Processor 15 calculates, on the basis of the position of that comparator, the value for N and passes this to the variable divider 4. In the case of a low cell rate, the counter 13 reaches a relatively high value, and the value of N likewise becomes relatively high, as a result of which the value of $f \pm \Delta/N$ is relatively low.

D. REFERENCES

EP 0 381 275 B1 in the name of KONINKLIJKE PTT NEDERLAND N.V.

I claim:

1. A clock recovery circuit for an asynchronous transfer mode (ATM) receiver for automatically deriving, from a cell rate of received ATM cells, a clock frequency of a source signal so as to form a recovered clock signal, which is transmitted by the ATM cells, the circuit comprising:

first means for determining, in response to the cell rate of the received cells, a nominal bit rate of the source signal and for generating a recovered clock signal having a frequency selected, in response to the nominal bit rate, from a plurality of predefined frequencies; and second means, connected to the first means, for correcting, in proportion to a difference between the nominal bit rate and a mean actual bit rate of the received cells, the frequency of the recovered clock signal.

2. The clock recovery circuit according to claim 1, wherein said first means comprise:
- a division factor unit for determining, in response to two or more successive cell arrival times, the nominal bit rate of the source signal transmitted by the ATM cells and for generating a division factor as a function of the nominal bit rate; and
- a frequency divider for dividing the frequency of a variable clock signal produced by a clock generator by the division factor so as to yield the recovered clock signal.

3. The clock recovery circuit according to claim 2, wherein said second means generates, in proportion to both a number of cell bits received over a period of two or more successive cell arrival times and a number of clock pulses produced by the frequency divider over the cell arrival time period, a frequency control signal to a clock generator, the clock generator producing the variable clock signal.

4. The clock recovery circuit according to claim 3 further comprising:
- first and second identical multivibrators wherein network clock pulses are presented, in proportion to the cell bits received, to the first monostable multivibrator, and the clock pulses produced by the frequency divider are presented to the second monostable multivibrator, the first and second multivibrators being identical;
- an integration circuit;
- a voltage-controlled oscillator; and
- an amplifier having positive and negative inputs wherein outputs of the first and second multivibrators are respectively connected to the positive and negative inputs of the amplifier, and an output of the amplifier is connected, via the integration circuit, to a frequency control terminal of the voltage-controlled oscillator, the voltage-controlled oscillator being the clock generator.

5. The clock recovery circuit according to claim 1 further comprising a buffer, wherein the bits of an ATM cell arriving at the receiver are written into the buffer under control of a network clock signal and contents of the buffer are read under the control of the recovered clock signal generated by the first means.

* * * * *